US008539137B1

(12) United States Patent
Protassov et al.

(10) Patent No.: US 8,539,137 B1
(45) Date of Patent: Sep. 17, 2013

(54) SYSTEM AND METHOD FOR MANAGEMENT OF VIRTUAL EXECUTION ENVIRONMENT DISK STORAGE

(75) Inventors: Stanislav S. Protassov, Moscow (RU); Alexander G. Tormasov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 1495 days.

(21) Appl. No.: 11/757,598

(22) Filed: Jun. 4, 2007

Related U.S. Application Data

(60) Provisional application No. 60/804,384, filed on Jun. 9, 2006.

(51) Int. Cl.
*G06F 12/00* (2006.01)
(52) U.S. Cl.
USPC ............... 711/6; 711/203; 718/104; 719/324
(58) Field of Classification Search
USPC ..................................................... 711/6, 203
See application file for complete search history.

(56) References Cited

U.S. PATENT DOCUMENTS

| | | | | |
|---|---|---|---|---|
| 5,566,331 | A * | 10/1996 | Irwin et al. ............................. 1/1 |
| 6,802,062 | B1 * | 10/2004 | Oyamada et al. ................. 718/1 |
| 6,823,458 | B1 * | 11/2004 | Lee et al. .......................... 726/16 |
| 6,857,059 | B2 * | 2/2005 | Karpoff et al. ................. 711/209 |
| 7,412,702 | B1 * | 8/2008 | Nelson et al. ...................... 718/1 |
| 7,849,098 | B1 * | 12/2010 | Scales et al. .................. 707/781 |
| 7,865,893 | B1 * | 1/2011 | Omelyanchuk et al. ........... 718/1 |
| 2005/0132365 | A1 * | 6/2005 | Madukkarumukumana et al. ................. 718/1 |
| 2005/0268298 | A1 * | 12/2005 | Hunt et al. ........................ 718/1 |
| 2006/0005189 | A1 * | 1/2006 | Vega et al. ........................ 718/1 |
| 2006/0069828 | A1 * | 3/2006 | Goldsmith .................... 710/100 |
| 2007/0016904 | A1 * | 1/2007 | Adlung et al. ..................... 718/1 |
| 2007/0234342 | A1 * | 10/2007 | Flynn et al. .................... 717/174 |

OTHER PUBLICATIONS

Muller, Al, and Seburn Wilson. Virtualization with VMware™ ESX Server™. 1. Rockland, MA: Syngpress Publishing, Inc., 2005. Print.*
Warren, Steven. The VMware workstation 5 handbook. Hingham, MA: Charles River Media, Jun 1, 2005. 352. Print.*
JeongWon Kim; SeungWon Lee; KiDong Chung; , "Implementation of zero-copy with caching for efficient networked multimedia service in Linux kernel," Multimedia and Expo, 2001. ICME 2001. IEEE International Conference on , vol., no., pp. 1215-1218, Aug. 22-25, 2001.*
What is Xen?, http://wiki.xensource.com/xenwiki/XenOverview.*

* cited by examiner

*Primary Examiner* — Sheng-Jen Tsai
*Assistant Examiner* — Ramon A Mercado
(74) *Attorney, Agent, or Firm* — Bardmesser Law Group

(57) ABSTRACT

A method, system and computer program product for storing data of a Virtual Execution Environment (VEE), such as a Virtual Private Server (VPS) or a Virtual Machine, including starting an operating system running a computing system; starting a Virtual Machine Monitor under control of the operating system, wherein the VMM virtualizes the computing system and has privileges as high as the operating system; creating isolated Virtual Machines (VMs), running on the computing system simultaneously, wherein each VM executes its own OS kernel and each VM runs under the control of the VMM; starting a storage device driver and a file system driver in the operating system; mounting a virtual disk drive; starting VM-specific file system drivers in the VM, the VM specific file system driver together with the common storage device drivers support virtual disk drives, the virtual disk drive is represented on the storage device as a disk image, the disk image data are stored on the storage device as at least one file that includes user data storage blocks and redirection blocks, the redirection blocks point to user data storage blocks, the redirection blocks have a multilevel hierarchy, and the internal structure is used by the VM-specific file system driver.

21 Claims, 8 Drawing Sheets

SYSTEM AND METHOD FOR MANAGEMENT OF VIRTUAL EXECUTION ENVIRONMENT DISK STORAGE

CROSS-REFERENCE TO RELATED APPLICATIONS

This patent application is a Non-Provisional of U.S. Provisional Patent Application No. 60/804,384; Filed: Jun. 9, 2006, entitled: SYSTEM AND METHOD FOR MANAGEMENT OF VIRTUAL EXECUTION ENVIRONMENT DISK STORAGE, which is incorporated by reference herein in its entirety.

BACKGROUND OF THE INVENTION

1. Field of the Invention

This invention relates to a method, system and computer program product for dynamically managing storage requirements of virtualized systems.

2. Description of the Related Art

Current trends in system and application development today involve ever increasing use of virtualized hardware. For example, servers are often virtualized, as are processors and operating systems. An example of a virtualized server is a Virtual Private Server (VPS or Virtual Environment, VE), such as those supplied by SWsoft, Inc. Other examples of virtualized hardware involve Virtual Machines that virtualize a processor and/or an operating system running on the processor. Examples of such Virtual Machines are marketed by, for example, Parallels Software International, Inc., Microsoft Corporation, and VMware, Inc.

One of the issues that needs to be addressed in such systems is the scalability of storage. Although the price of storage continues to fall, user requirements increase at least at the same rate. For example, a single virtual server or Virtual Machine may be allocated on the order of 10 Gigabytes of storage. 10 Gigabytes, by current (2006) standards, is a relatively manageable amount, since commonly available hard drives that store 100-200 Gigabytes can be purchased for a few hundred dollars, or even less.

However, scalability of this brute force approach presents a problem. While one virtual server or Virtual Machine may require only 10 Gigabytes of storage, 100 such Virtual Machines or virtual servers would require one terabyte of storage. This, while commercially available, is relatively expensive—costing on the order of $1,000.

There is therefore a need for storage device virtualization for Virtual Execution Environments (VEEs) of different kinds Since Virtual Execution Environments use generic operating systems, standard procedures for accessing storage devices and presentation of data being stored are also required. At the same time, using storage areas that are dedicated to each environment requires redundant resources and complex technical solutions. Concurrent access to storage device from different Virtual Execution Environments that are invisible to each other may corrupt content of the storage device's service structures, as well as its contents.

The simplest way to organize storage areas for Virtual Execution Environment is to assign a drive partition for each one. This consumes excess storage capacity and does not provide for sharing of data between different VEEs.

Using a set of files for storing data related to virtual storages is preferable, since shared data may be stored as a single file shared among several VEEs.

There are some conventional techniques for handling changed file content:

(1) In traditional file systems, a formatted disk or disk partition of a fixed size is used for storing file data in an organized form. Such structures provide a possibility of fast reads and writes of the data, but require a lot of disk space reserved for the file system, since predefined disk storage space should be separated, e.g. in the form of disk partition. For better stability of operating system even after unexpected crashes, journalled file systems are used. The journalled file maintains a log, or journal, of activity that has taken place in the primary data areas of the disk. If a crash occurs, any lost data can be restored, because updates to the metadata in directories and bitmaps have been written to a serial log.

Examples of journalled file systems include, e.g., NTFS, Linux, ext3, reiserfs, IBM Journaled File System 2 (JFS2), open source JFS project for Linux, and Xfs.

(2) VMware full image files, can be managed as they grow. The image files of this kind at first are smaller than the imaged disk (virtual storage) of a virtual computer (or of the Virtual Machine, VM), and grow when data is added to the virtual storage. Such image files contain a lot of unnecessary data, since blocks of a predefined size could only be added to the image file, and the contents of the block may contain useless data. Also, deletion of the data from the disk image does not reduce the image file. Handling of such images, with their linear structure, is not a trivial task, since structures like B-trees are not supported, and each write to the image file requires converting block address of virtual disk to block address of real disk where image file is stored.

(3) Database transactions, which are used to control data commitment to databases. For example, in standard account procedures, it is necessary to modify several databases simultaneously. Since computers fail occasionally (due to power outages, network outages, and so on) there is a potential for one record to be updated or added, but not the others. To avoid these situations, transactions are used to preserve consistency of the file as one of the goals.

In some databases, for example, MySQL open source database, the main database engine is implemented using B-trees/B+trees structures. It is used for fast determination of record data placement in files that contain database data.

(4) Encryption software that stores a partition image in file. For example, StrongDisk, and PGPdisk provide this option.

(5) Other software provides the ability to store disk data in archived or modified manner. For example, Acronis True Image™ has the ability to store disk data on a block level.

(6) Windows sparse files with one or more regions of unallocated data in them. In most Unix systems, all files can be treated as sparse files.

Accordingly, there is a need in the art for an effective way to allocate storage in systems running multiple virtualized servers or processors.

SUMMARY OF THE INVENTION

Accordingly, the present invention is related to a system, method and computer program product for managing Virtual Execution Environment storage that substantially obviates one or more of the disadvantages of the related art.

In one aspect, there is provided a system, method and computer program product for storing data of a Virtual Execution Environment (VEE), including launching, on a computer system, isolated VEEs with a shared OS kernel; starting a common storage device driver and a common file system driver; mounting a virtual disk drive for each VEE, wherein each VEE has its own file system drivers for handing a disk image of its VEE; wherein the virtual disk drive is represented on the storage device as a disk image, and wherein the disk image is stored on a physical storage device or on a network storage device as at least one file.

In a further aspect, the file can be a generic file whose size is dynamically changed when content of the virtual disk drive is changed. The file of the virtual drive further has an internal structure includes user data storage blocks and redirection blocks that point to user data storage blocks and that are used by the VEE-specific file system driver. At least one file has a B-tree or B+tree structure. The redirection blocks have a multilevel hierarchy. The virtual drive supporting means is running in operating system space and is used by different VEEs. The disk image includes files common to different VEEs. The disk image files are dynamically updated during writes to the virtual disk drive. The disk image files are reduced in size to exclude data corresponding to unused blocks of the virtual disk drive. The disk image files contain only used blocks data. Some disk image files can be shared between VEEs. The drive image files support starting the VEE contents on another hardware system or other VEE. The internal structure of the at least one file provides a possibility of writes to the disk image in a fault tolerant manner; and any virtual disk writes are added to the at least one file with preserving the internal structure integrity in any moment of time. Online or offline snapshotting of the virtual disk drive can be performed using an internal structure of the at least one file.

In another aspect, there is provided a method, system and computer program product for storing data of a Virtual Machine, including starting an operating system running a computing system; starting a Virtual Machine Monitor (VMM) under control of the operating system, wherein the VMM virtualizes the computing system; creating isolated Virtual Machines (VMs), running on the computing system simultaneously, wherein each VM executes its own OS kernel and each VM runs under the control of the VMM; starting a common storage device driver and a common file system driver in the operating system; mounting a virtual disk drive; starting VM-specific file system drivers in the VM. The VM specific file system driver together with the common storage device drivers support virtual disk drives. The virtual disk drive is represented on the storage device as a disk image. The disk image data are stored on the storage device as at least one file that includes user data storage blocks and redirection blocks, the redirection blocks point to user data storage blocks. The redirection blocks have a multilevel hierarchy. The internal structure is used by the VM-specific file system driver. The disk image files can be dynamically updated during writes to the virtual disk drive, and/or can be reduced in size to exclude data corresponding to unused blocks of the virtual disk drive, and/or can contain only used blocks data, and/or can be shared between VEEs.

In another aspect, there is provided a method, system and computer program product for storing data of a Virtual Machine, including starting a Virtual Machine Monitor (VMM) running with system level privileges; creating a primary Virtual Machine (VM) without system level privileges and having a host operating system (HOS) within it, the HOS having direct access to at least some I/O devices; creating a secondary Virtual Machine running without system level privileges; starting a common storage device driver and a common file system driver in the HOS; starting a VM-specific file system driver in the secondary VM; starting a VM-specific virtual device driver in the secondary VM that provides access to the virtual storage drive. The VM specific virtual device driver has access to the disk image files from the virtual device driver via the common file system driver and common storage device driver; and mounting a virtual disk drive. The virtual disk drive is represented on a real storage device as a disk image. The disk image data is stored on the real storage device as at least one file. The file of the virtual drive further has an internal structure includes user data storage blocks and redirection blocks that point to user data storage blocks and that are used by the VEE-specific file system driver.

In another aspect, there is provided a method, system and computer program product for storing data of Virtual Execution Environments, including starting a Virtual Machine Monitor (VMM) with system level privileges; creating a primary Virtual Machine (VM) without system level privileges and having a host operating system (HOS) running within it; starting, a common safe interface providing secure access from the VMs to computing system hardware; creating a secondary Virtual Machine running without system level privilege, wherein the secondary VM uses the common safe interface for accessing hardware; starting a common storage device driver and a common file system driver in the HOS; starting a VM-specific file system driver in the secondary VM; starting a VM-specific virtual device driver in the secondary VM that provides access to the virtual storage drive and has access to the disk image files from the virtual device driver via common file system driver, common storage device driver and the common safe interface; and mounting a virtual disk drive for the secondary VM; The virtual disk drive is represented on a real storage device as a disk image. The disk image data is stored on the real storage device as at least one file.

In another aspect, there is provided a method, system and computer program product for storing data of Virtual Execution Environments, including starting an operating system on a computing system that uses a file system cache area for storing disk data being read or written; starting a Virtual Machine Monitor (VMM) under the control of the operating system; starting isolated Virtual Machines (VMs) on the computing system, wherein each VM executes its own OS kernel and each VM runs under the control of the VMM; starting a common storage device driver and a common file system driver in the operating system; mounting a virtual disk drive, the virtual disk drive provides correct functioning of the VM; starting a VM-specific file system drivers in the VM that, jointly with the common drivers, supports a virtual disk drive that is represented on the storage device as a disk image. The disk image data is stored on the storage device as at least one file. Writes to the file are executed by bypassing the cache area. The internal structure of file enables writes to the disk image in a fault tolerant manner. Any virtual disk writes are added to the file while preserving the internal structure integrity of the file at any moment of time. As will be appreciated, the various aspects described above are applicable to different types of VEEs.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
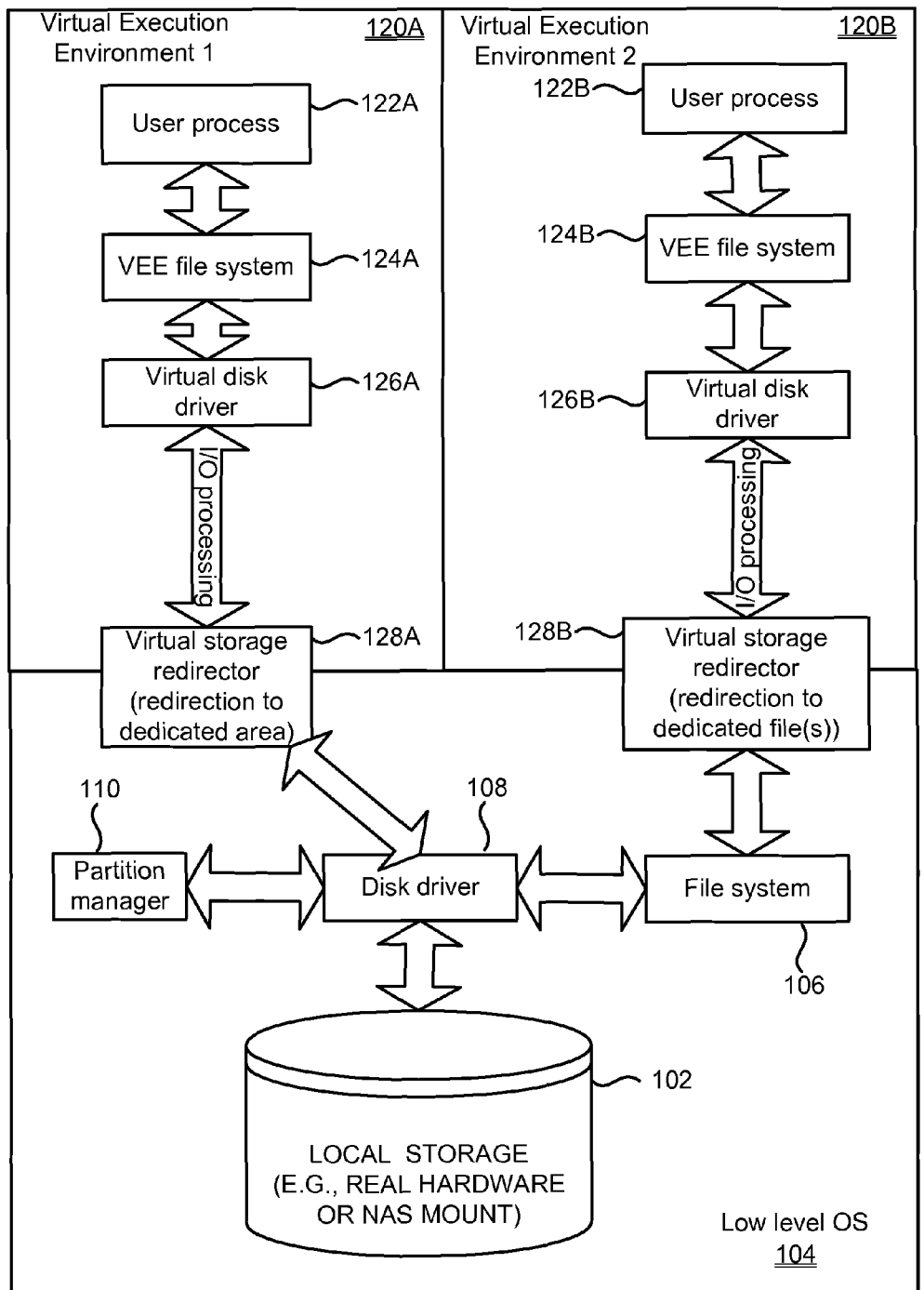
FIG. 1 illustrates an embodiment of the invention where virtual drives are handled using virtual storage redirectors between the Virtual Execution Environments and a low-level operating system area with direct access to local storage.

Reference will now be made in detail to the preferred embodiments of the present invention, examples of which are illustrated in the accompanying drawings.

The present invention provides dynamic allocation storage space, required for supporting virtual storage in the Virtual Execution Environments. The following definitions are generally used throughout this description:

VEE—a type of environment that supports program code execution, where at least a part of the real hardware and software required for running program code are presented as their virtual analogs. From the point of view or the user, that the code in VEE runs as if it were running on the real computing system.

VPS—Virtual Private Server (or VE), is one type of a Virtual Execution Environment (VEE) running on the same hardware system with a shared OS kernel and most of the system resources, where isolation of Virtual Execution Environments is implemented on the namespace level. A Virtual Private Server (VPS) is a closed set, or collection, of processes, system resources, users, groups of users, objects and data structures. Each VPS has an ID, or some other identifier, that distinguishes it from other VPSs. The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions is desirable, as if the VPS were a dedicated remote server, with the existence of the VPS being transparent from the perspective of both the VPS user and the VPS administrator.

VM—a type of an isolated Virtual Execution Environments running on the same physical machine simultaneously. Each Virtual Machine instance executes its own OS kernel. Support of Virtual Machines is implemented using a Virtual Machine Monitor and/or a Hypervisor. An example of a VM is a VMware Virtual Machine.

Hypervisor—control software having the highest privilege level for administrating hardware computer resources and Virtual Machines. One embodiment of the hypervisor is used in the Xen open source project.

Virtual storage—block-level storage space that may be regarded by the user of a computer system as addressable hardware storage, or a storage partition, using virtual addresses, that are utilized during virtual disk input/output operations as physical addresses.

Generic file or consistent set of files—represents storage device use of a disk image. Examples of generic files are VMware virtual disk and VPS private area. A generic file may have internal structures, for example, B+tree structures for providing update of disk image during I/O operation. One example of updating a generic file includes use of transactions. In one embodiment of the invention, the transactions are performed with direct access to the storage device, without using a file system cache normally used by the operating system for caching file system reads and writes.

Disk image—a set of data that represents contents of a disk storage or contents of a partition corresponding to virtual storage on a block level.

Virtual disk driver—an OS driver that enables other programs to interact with a virtual hardware device. The virtual disk driver may be implemented as a special driver or may be implemented by adding, to the standard hardware driver, additional functionality, for example, filtering or redirecting ability.

Free space—disk storage blocks that are mapped to the disk storage, but do not contain useful data. In other words, free blocks that are not used by the file system driver and their content is not generally useful. One embodiment of the invention provides a possibility of writing, to the generic file, only blocks that are used on the virtual image.

Migration—process of transferring data associated with VPS or VM using generic file.

Optionally, a generic file may contain checkpoints, which provide for migrating not only of the current state of the Virtual Execution Environment, but also of previous states. Other options include copying the VEE as a file to the disk storage, and exporting the VEE to another hardware system or cloning the VEE on the same computer.

Online snapshotting of an image—process of creating a disk snapshot without terminating current operations with the disk image. Since the disk image is stored as a file, snapshotting of the image at any predefined point in time may be implemented. All that is needed is creating additional file for registering transactions. Another embodiment includes copy-on-write snapshotting technique.

Transactions—the main requirement is secure handling of disk images. Registration of transactions is implemented as units of interaction of Virtual Execution Environments with virtual data storage. Transaction registration, along with creation generic files with proper structure, simplifies this. Emergency termination of registering transactions should not corrupt the disk image. It also simplifies creating snapshots of virtual storage. All virtual storage transactions are treated independently from each other.

Snapshot—data that correspond to all used blocks in virtual storage at a certain moment in time. It optionally may contain page file blocks and other runtime information.

The proposed approach is fault tolerant and makes it possible to improve performance of computing systems running VEEs, since more effective structures are used for storage.

Scalability and portability of the storage device is provided, since storage resources are dynamically allocated to VEE and are independent of the hardware storage configuration.

Disk images may be created on the storage drive (including hard drive or net storage drives), and might not contain free blocks, except for some number of virtual free blocks or data related to virtual storage drive capacity or capacity of free blocks, for example, the number of virtual clusters that are free or alignment data. Disk images have a predefined virtual storage capacity that is preferably constant for all VEEs, but may be changed with the help of system tools. Disk image size at system start is normally less then virtual storage capacity. Each disk image is accessible to user processes of at least one isolated Virtual Execution Environment (keeping in mind common access to virtual storages from VM or VPS, where, with real hardware, it is possible to share disk storages of different VMs, by providing access rights and organizing communication channels, for example, through emulating network communication.

The Virtual Execution Environment, as discussed herein, may be of any number of types. For example, they can be Virtual Private Servers. They can be Virtual Machines, such as those from VM ware or Microsoft. They can be Virtual Machines, in the model of XEN, that use a Hypervisor and a Service OS. They can also be Virtual Machines that utilize a Lightweight Hypervisor, such as those marketed by Parallels Software International. Also, SWsoft, Inc.'s isolated VEs may be used as another example.

FIG. 1 illustrates an embodiment where virtual drives are handled using virtual storage redirectors between Virtual Execution Environments and a low-level operating system that has direct access to computing hardware resources. Here, a disk driver of Virtual Execution Environment 1 (128A) may use a file system that is at least partially shared for all VEEs of its type, and therefore is redirected to a common disk driver that directly interfaces with the storage 102. On the other hand, VEE 2 (128B) is redirected to a file system, and the OS 104 manages disk access.

The disk driver of Virtual Execution Environment 2 (128B) handles dedicated real files and therefore is redirected to the common file system.

Figure 2:
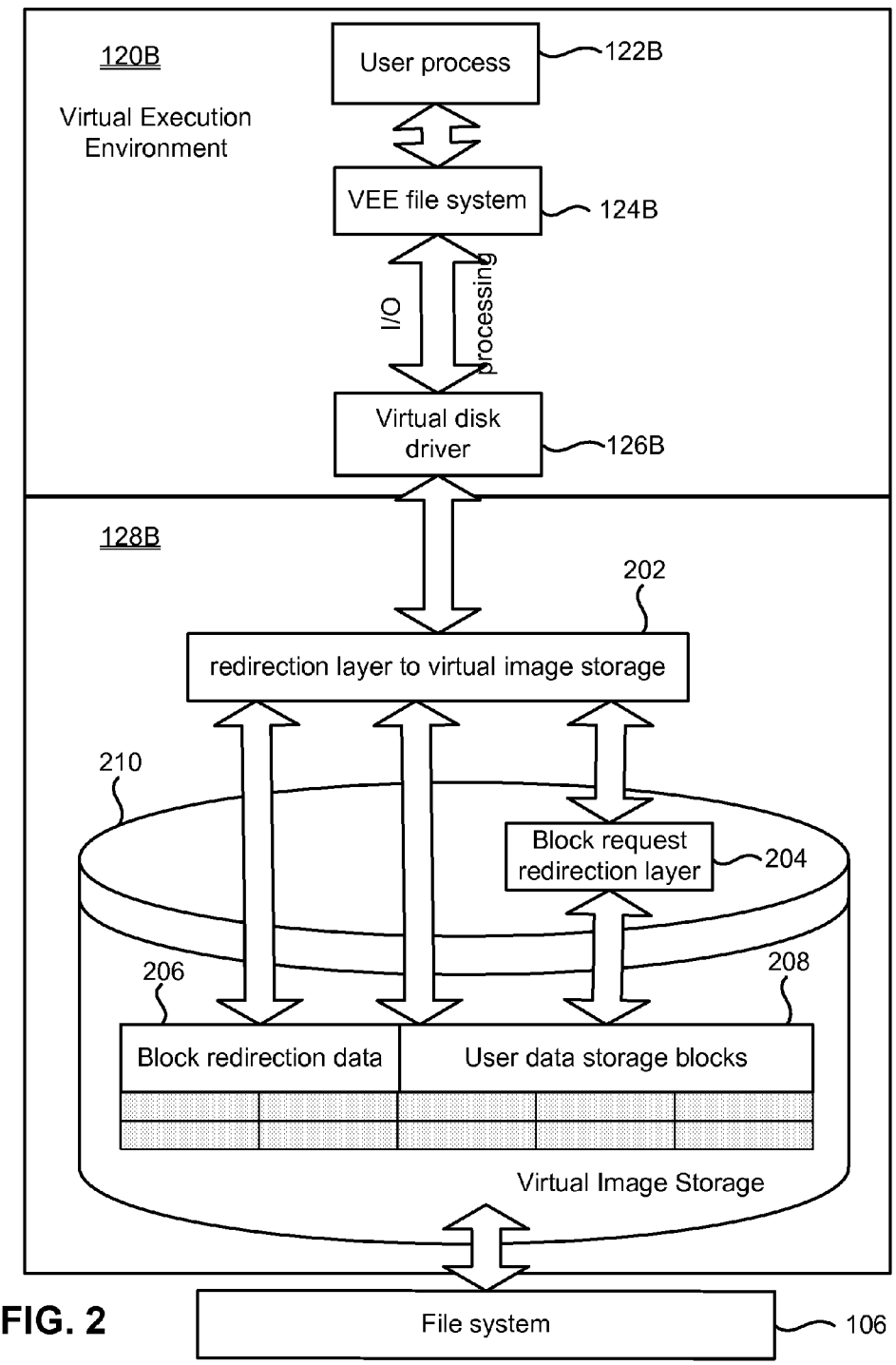
FIG. 2 illustrates an embodiment of the invention where a virtual storage redirector is responsible for consistency of disk image files and uses a common file system for handling virtual disk reads and writes.

FIG. 2 shows an embodiment of the invention wherein virtual drive supporting means are responsible for consistency of disk image files and use common file system for handling virtual disk reads and writes.

Figure 3:
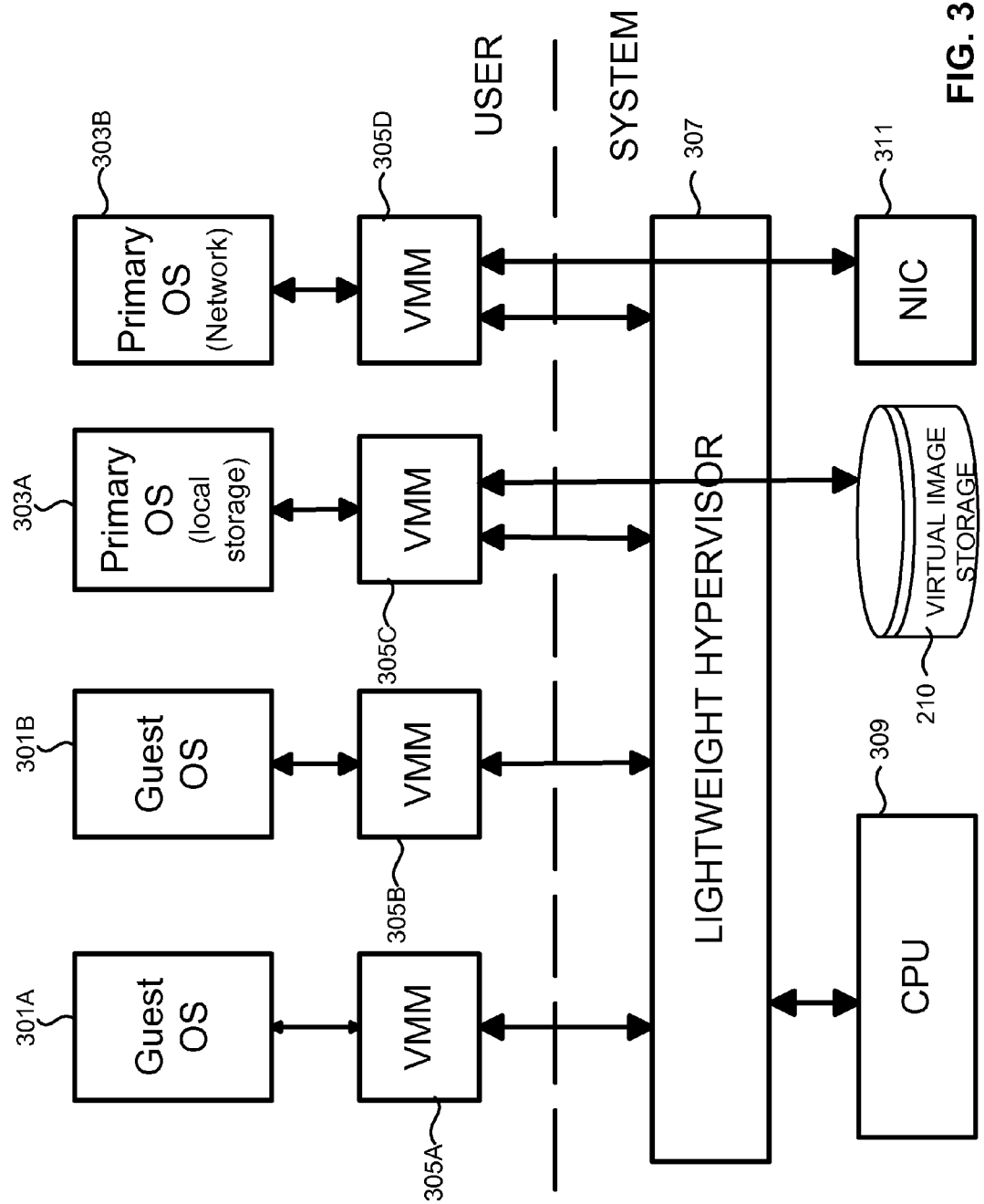
FIG. 3 illustrates an embodiment of a Lightweight Hypervisor Virtual Machine system, where Guest Operating Systems use Primary Operating System's drivers for access to storage drives.

FIG. 3 shows an embodiment of a system where Guest Operating Systems use Primary Operating Systems drivers for access to storage drive. Herein Primary OS has direct access to computing system hardware. The present invention may be used in such a system.

Figure 4:
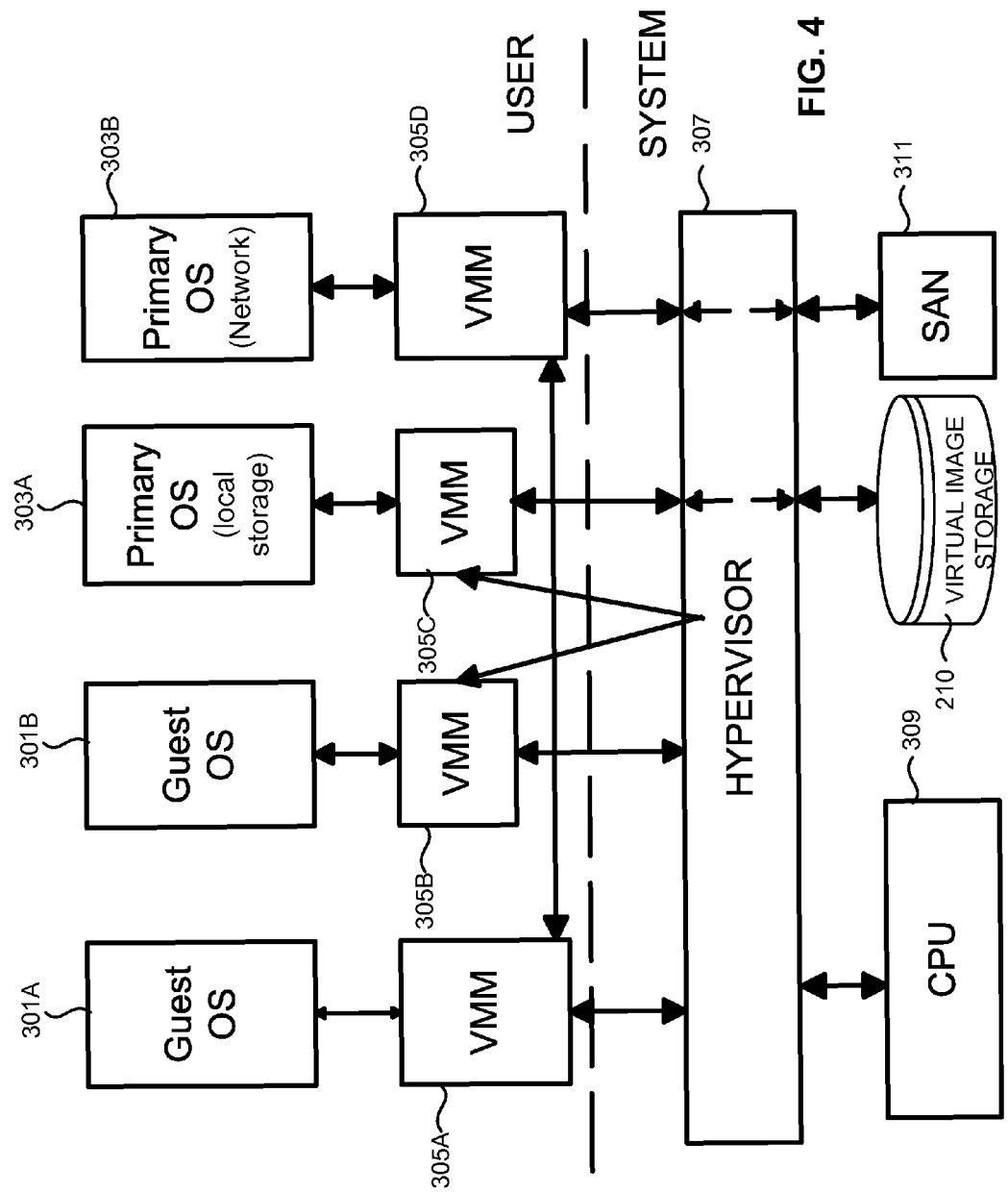
FIG. 4 illustrates an embodiment where Guest Operating Systems use Primary Operating Systems drivers for access to the disk drives when handling virtual storage.

FIG. 4 shows an embodiment where Guest Operating Systems use Primary Operating Systems drivers for access to storage drive while handling virtual storage. Here, Primary OS accesses computing system hardware via a common safe interface (a Hypervisor). Furthermore, Guest Operating Systems can access computing system hardware via the Hypervisor. This architecture is also available for using the present invention.

Figure 5:
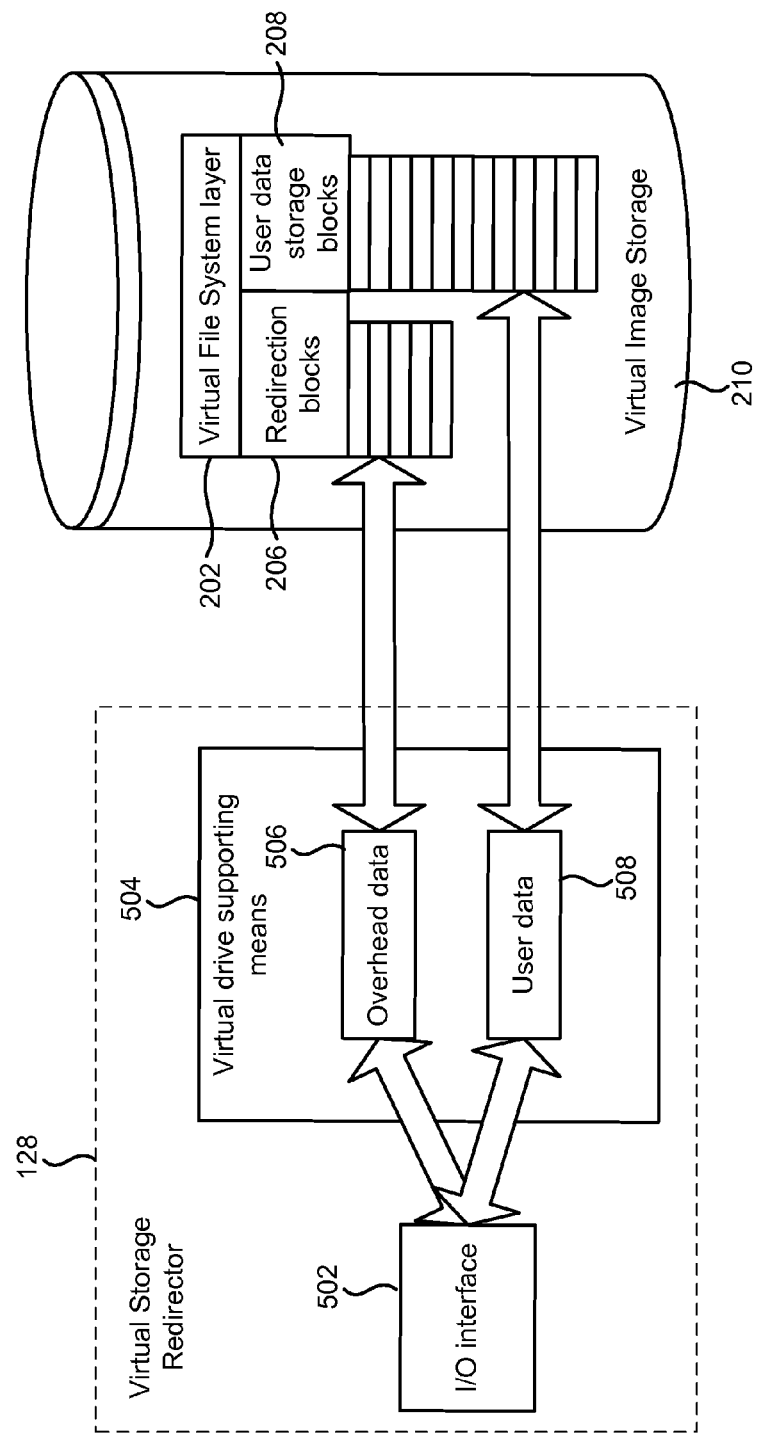
FIG. 5 illustrates an embodiment where the virtual drive supporting means forms file structures corresponding to the virtual drives.

FIG. 5 shows an embodiment where virtual drive supporting means forms file structures corresponding to the virtual image storage in a safe manner with high performance.

For this purpose virtual drive supporting means assign areas of the storage device required for storing and writing virtual disk data. Also, virtual drive supporting means forms a file with an internal structure that includes user data storage blocks and redirection blocks. All the data formed by virtual drive supporting means are written to storage device using a file system driver and/or a device driver. In one embodiment of the invention, the file containing redirection blocks can include redirection blocks with a multilevel hierarchy, for example, it can have a B-tree or B+tree structure.

FIG. 1 illustrates one embodiment of the present invention. As shown in FIG. 1, in a system that has a number of Virtual Execution Environments (only two are shown in this figure, designated by 120A and 120B, although it should be understood that the actual number can be anywhere from one to hundreds or even thousands), and with a low level operating system 104. The computer 802 has local storage 102. The local storage 102 is typically a real (non-virtualized) hard drive, although other means for providing storage can be used, such as RAIDS, network storage drives, SANs, etc. As noted earlier, the most common example today is a local hard drive.

Low-level operating system 104 has a file system 106, and a disk driver 108 that it uses to actually "talk" to the local storage 102. Data of the disk image may be stored directly inside the disk partition, which will require partition manager intervention. A partition manager 110 is most commonly activated at initialization, as is known conventionally. Each of the Virtual Execution Environments 120 can be running a user process, or multiple user processes, designated in FIG. 1 by 122A, 122B. Each Virtual Execution Environment also normally has its own file system, designated by 124A, 124B in FIG. 1. The file system 124 is virtualized—in other words, it is a file image that is stored in the local storage 102 in some fashion, as discussed further below. Each Virtual Execution Environment 120 also has a virtual disk driver, here, 126A, 126B. The virtual disk driver 126 is used to talk to virtualized storage (see 210 in FIG. 2) (although typically the Virtual Execution Environment itself is not aware that the storage 210 is virtualized). Actual interaction with the storage 102 is through a virtual storage redirector, labeled 128A, 128B.

The present invention makes it possible to overcommit storage to a particular Virtual Execution Environment, through the use of the mechanisms described below and illustrated in the figures. One of the facts of life of modern storage utilization is that frequently, many of the Virtual Execution Environments do not use all of the storage that is actually allocated to them—for example, many users want the ability to store large files, for example, video files, or large picture files, but, in practice, rarely take advantage of the full amount of storage available to them. Therefore, the virtualized file system 124, illustrated in FIG. 1, can be virtualized as a file whose size can dynamically change, as needed.

FIG. 2 provides additional illustration of one embodiment of the present invention. As shown in FIG. 2, one of the Virtual Execution Environments 120B running on the computer (in this case, a Virtual Machine-type VEE) has a user process 122B, a file system 124B, and a virtual disk driver 126B. Virtual disk driver 126B communicates to a redirection layer 202. The redirection layer 202 interfaces to virtual image storage 210, either directly or through a block request redirection layer 204. This communication therefore involves two types of entities—user data, stored in user data storage blocks 208, and block redirection data 206. The block redirection data 206 can be viewed as a form of overhead, which the redirection layer 202 requires in order to figure out where the user data for this particular user is actually stored on the physical storage device 102. Virtual image storage 210 content is stored as a file or a set of files on the physical storage device 102 and may be accessed by means of driver, which supports the file system 106. Overhead data can contain, for example, information—where in the file is stored data related to partition offset in virtual storage.

The degree of control by the Primary OS (POS) 303 and the VMM 305 over processor resources and the processor's privileged instructions can vary. As examples, a hosted VMM system may be used, where VMM is installed on a host that runs an operating system independently of the VMM. FIG. 3, illustrates one option, such as provided by Parallels Software International, Inc. that uses a particular mechanism called the "Lightweight Hypervisor" 307 which restricts the ability of both the Primary OS 303A, 303B and the VMM 305A-305D to issue instructions that affect the interrupt descriptor table (IDT). Thus, the Lightweight Hypervisor processes all interrupts and exceptions in the system and dispatches them to the POS and VMMs based on its virtualization policy.

Hypervisor-based VMMs combine the advantages of the prior art systems, and eliminate major disadvantages. The Hypervisor runs on the system level and creates Virtual Machines on the user level. One of the VMs runs a so-called "Primary OS" (POS) 303A and has privileges to handle some of the hardware (e.g., CPU 309, network interface card 311) directly. Other VMs and the Hypervisor 307 uses Primary OS 303 and its hardware drivers for communication with the actual hardware. At the same time, the Hypervisor 307 employs efficient memory management, processor scheduling and resource management without the help of the Primary OS 303. The advantages of the Hypervisor-based approach are high VM isolation, security, efficient resource management and a small trusted Hypervisor footprint.

The Lightweight Hypervisor 307 runs on the system level, reloads the Interrupt Descriptor Table (IDT) and protects it from modification by the Primary OS 303 and the VMM 305. The Primary OS 303 and the VMMs 305 are not allowed to modify IDT and they are not allowed to independently process interrupts. The Lightweight Hypervisor 307 coexists in all address spaces (Primary OS' context and VMMs' contexts) and exclusively processes all hardware interrupts and exceptions. It is responsible for interrupt forwarding, context switching between the Primary OS 303 and VMMs 305, and for efficient resource scheduling.

Thus, the Lightweight Hypervisor 307 is a small piece of software that helps manage VMMs 305 by handling hardware resource interrupts events. The Lightweight Hypervisor 307 captures the primary IDT pointer and replaces it with its own.

FIG. 4 illustrates another type of Virtual Execution Environment, here, the XEN type of virtualization. As shown in FIG. 4, many of the elements are similar to what is shown in FIG. 3, however, this type of system uses Service OS for direct access to the hardware, handling I/O and other types of interrupts.

FIG. 5 is another illustration of the embodiment of the present invention. Essentially, FIG. 5 is an alternative view of what is shown in FIGS. 1 and 2. As shown in FIG. 5, the virtual storage redirector 128 includes an I/O interface 502, and a virtual drive supporting means 504. The I/O interface 502 is what the operating system expects to see when it accesses a device, such as storage. The virtual drive supporting means 504 handles the overhead data 506 that is associated with storing the disk image in an optimal form.

In one embodiment, the optimal form of the disk image file may include specific file organization where disk image files are dynamically updated during writes to the virtual disk drive. In one embodiment, the disk image files contains only used blocks data, or the volume of "useless" data stored in the disk image files can be minimized. This is different from the conventional disk storages, where contents of unused blocks are stored on the disk unless the contents of unused blocks has been overwritten. To implement this feature, the disk image files can be reduced in size constantly or periodically to exclude data corresponding to unused blocks of the virtual disk drive. In one embodiment, unused blocks reflected in at least one image file may be overwritten by current write requests.

Examples of block redirection data 206, shown in FIG. 2, although there could be other types of overhead data as discussed above. Also, user data 508 is the data that the user process 122 actually works with, and stores on the local storage 102. The virtual storage redirector 128 communicates with the virtual image storage 210, use block redirection data 206 when redirection is required and stores the redirection data 206 and the user data 208 on the storage 210.

It should be noted that the virtual drive supporting means can run in operating system space and can be shared among different VEEs. As an example of implementation, each VEE's processes can have a unique ID corresponding to the VEE and the virtual drive supporting means can use a VEE-specific databases and settings for supporting I/O requests issued by processes of certain VEEs. Herein, a VEE-specific file system driver or even other drivers of the computing system may be implemented as a single driver that is common for multiple VEEs, but having VEE-specific behavior. In other words, each VEE has its own file system driver object or objects for handling a disk image of its VEE. Alternatively, different drivers for different VEEs can be used.

In some embodiments, the disk image can be created that includes files common to different VEEs. This disk image can be handled by using full access writes by processes of one VEE or by processes of the Host OS, and other VEEs can have read-only access to image data. Where multiple VEEs have a large amount of identical data, storing a single instance of identical data as a shared structure can save a lot of storage space. The identical shared data can be either the whole image or some disk image files or data related to files stored in the image.

Figure 6:
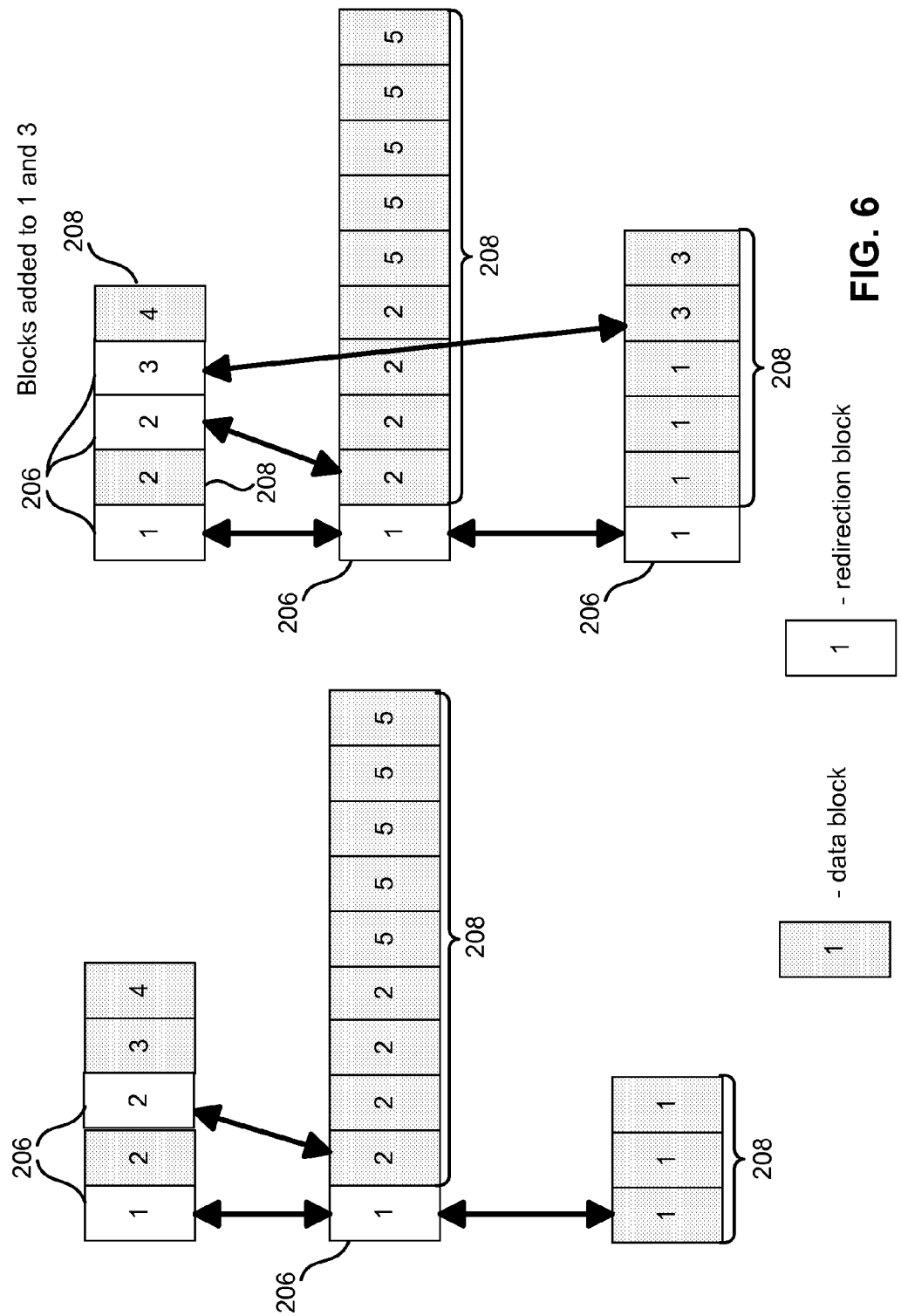
FIG. 6 illustrates an internal structure of the file and time diagram of changing the structure the file when adding data to the file.
Figure 7:
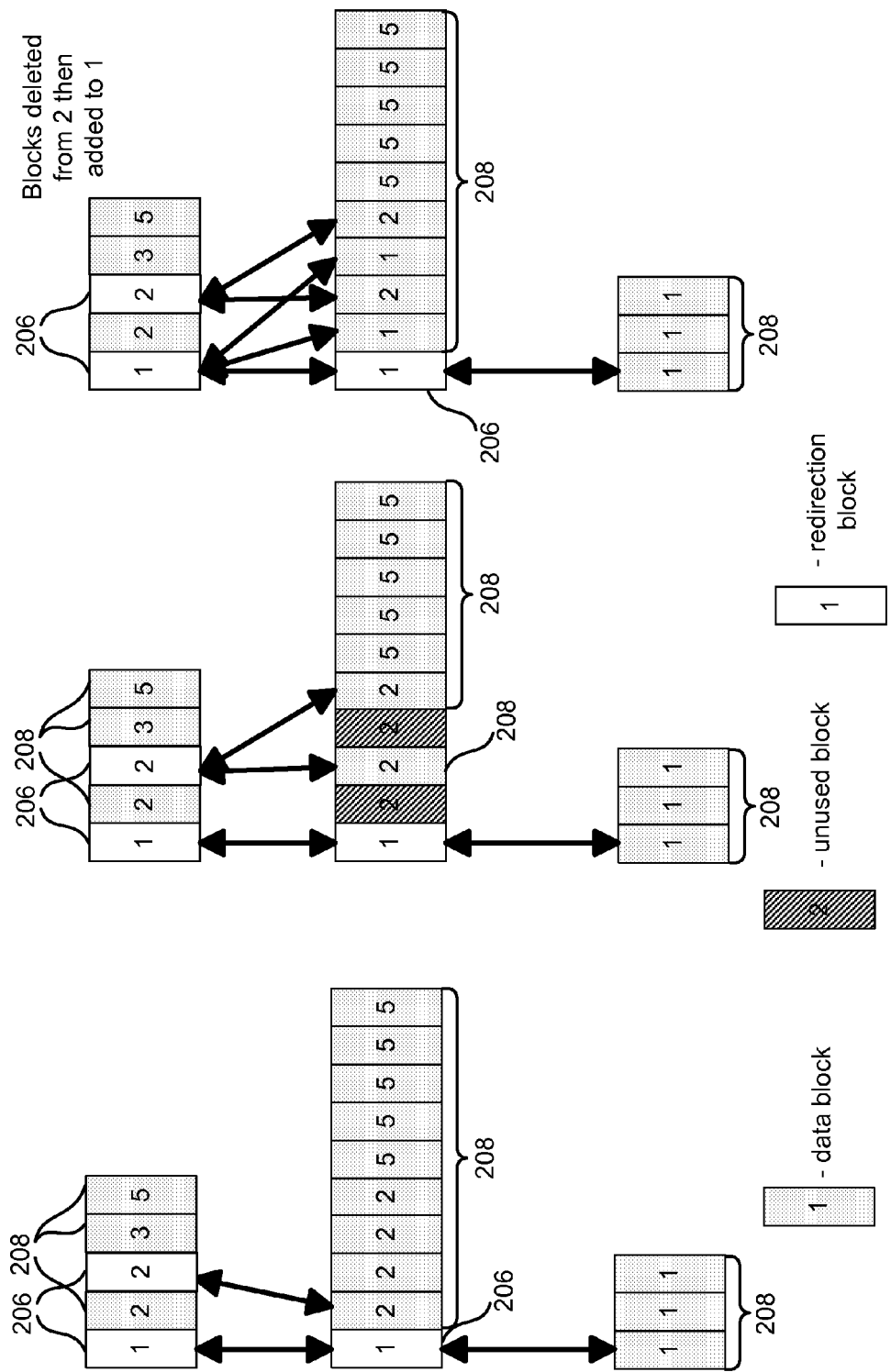
FIG. 7 shows changing of the file structure of FIG. 6 during deletion of blocks of the virtual drive in the file and using those blocks for writing new data.

FIG. 6 illustrates an internal structure of the file and time diagram of changing the structure the file when adding data to the file. FIG. 7 shows changing of the file structure of FIG. 6 during deletion of blocks of the virtual drive in the file and using those blocks for writing new data. See generally J. Gray and A. Reuter, ""Transaction Processing: Techniques and Concepts"", Morgan Kaufmann Pages 159-168 (1993); J. Gray and A. Reuter, "Transaction Processing: Techniques and Concepts", Morgan Kaufmann Pages 851-861 (1993); Mark Allen Weiss, Data Structures and Problem Solving Using C++ (Second Edition), Addison-Wesley, Pages 707-715 (2000), all incorporated herein by reference.

Figure 8:
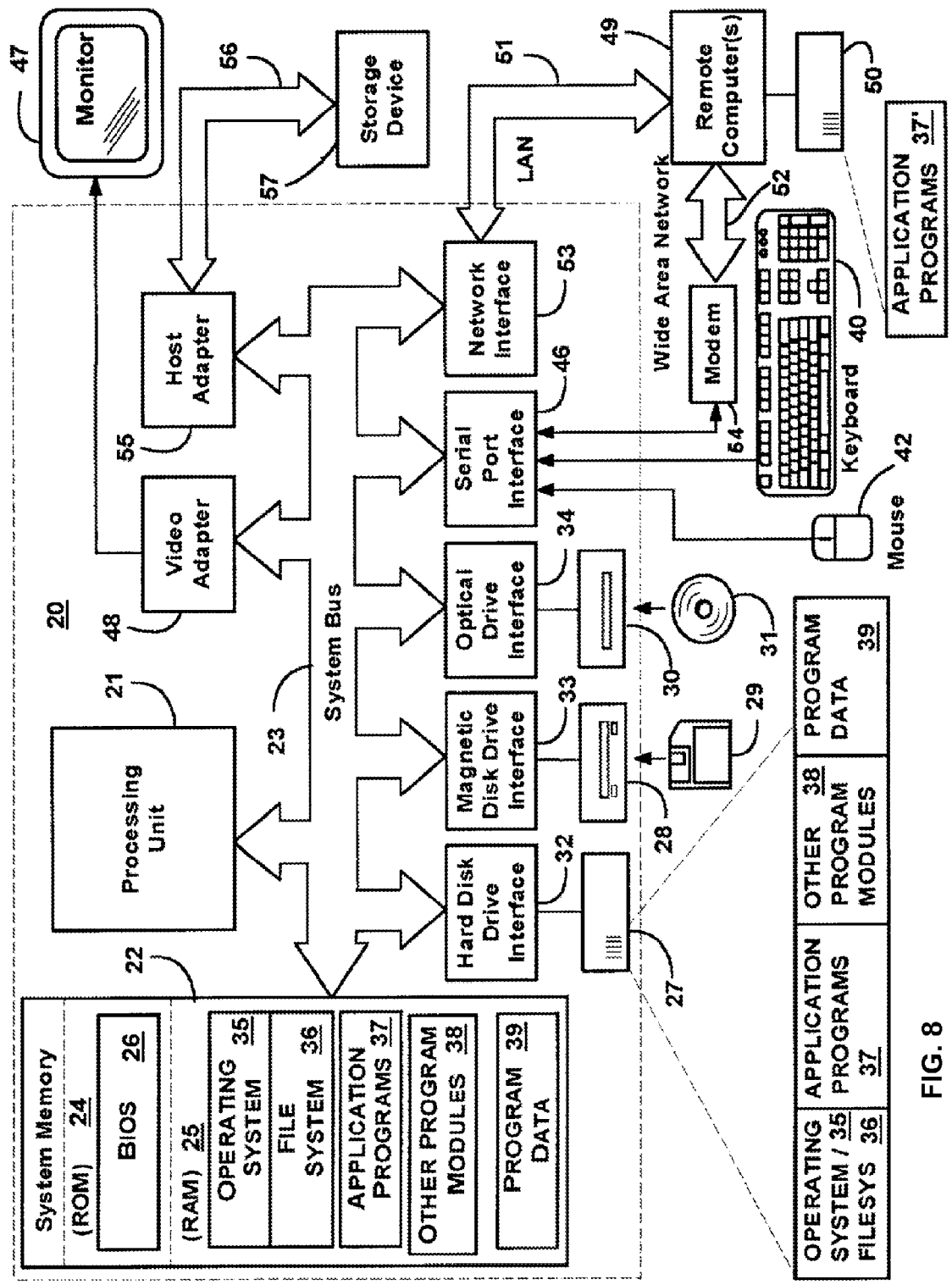
FIG. 8 shows an exemplary computer system for implementing the invention.

With reference to FIG. 8, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for storing data of a Virtual Execution environment (VEE), comprising:
    launching, on a computer system, isolated VEEs with a shared OS kernel providing services to the VEEs in response to requests from the VEEs;
    starting a common storage device driver and a common file system driver;
    mounting a virtual disk drive for each VEE, wherein each VEE has its own file system driver object for handling a disk image of its VEE;
    wherein the virtual disk drive is represented on the a storage device as a disk image, and
    wherein the disk image is stored on a physical storage device or on a network storage device as at least one file; and
    wherein the file of the virtual disk drive comprises an internal structure visible to the shared OS kernel that includes user data storage blocks and redirection blocks that point to user data storage blocks and that are used by the VEE's file system driver, and
    wherein at least some of the virtual drives permit an overcommitment of disk space to their corresponding VEEs relative to standard allocation of disk space.

2. The method of claim 1, wherein the file is a generic file whose size is dynamically changed when content of the virtual disk drive is changed.

3. The method of claim 1, wherein the at least one file has a B-tree or B+tree structure.

4. The method of claim 1, wherein the redirection blocks have a multi-level hierarchy.

5. The method of claim 1, wherein the VEEs' file system drivers and the common driver supporting the virtual disk drive are running in operating system space and are used by different VEEs.

6. The method of claim 1, wherein the disk image further comprises files common to different VEEs.

7. The method of claim 1, wherein the disk image files are dynamically updated during writes to the virtual disk drive.

8. The method of claim 1, wherein the disk image files are reduced in size to exclude data corresponding to unused blocks of the virtual disk drive.

9. The method of claim 1, wherein the disk image files contain only used blocks data.

10. The method of claim 1, wherein some disk image files can be shared between VEEs.

11. The method of claim 1, wherein the drive image files support starting the VEE contents on another hardware system or other VEE.

12. The method of claim 1, wherein an internal structure of the at least one file that allows for writes to the disk image in a fault tolerant manner; and
    any virtual disk writes are added to the at least one file with preserving the internal structure integrity in any moment of time.

13. The method of claim 1, further comprising online snapshotting of the virtual disk drive using an internal structure of the at least one file.

14. The method of claim 1, further comprising offline snapshotting of the virtual disk drive using an internal structure of the at least one file.

15. A method for storing data of a Virtual Machine, comprising:
   starting a host operating system running a computing system;
   starting a Virtual Machine Monitor (VMM) under control of the host operating system,
   wherein the VMM virtualizes the computing system and has privileges as high as the host operating system;
   creating isolated Virtual Machines (VMs), running on the computing system simultaneously, wherein each VM executes its own guest OS kernel and each VM runs under the control of the VMM;
   starting a storage device driver and a file system driver in the host operating system;
   mounting a virtual disk drive;
   starting VM-specific file system drivers in the VMs,
   wherein the VM specific file system driver together with common storage device drivers support the virtual disk drive,
   wherein the virtual disk drive is represented on a storage device as a disk image,
   wherein the disk image data are stored on the storage device as at least one file that includes user data storage blocks and redirection blocks visible to the host operating system, the redirection blocks point to user data storage blocks,
   wherein the redirection blocks have a multilevel hierarchy, and
   an internal structure of the at least one file is used by the VM-specific file system driver,
   wherein at least some of VMs utilize virtual free blocks as a part of disk image to permit an over-commitment of disk space.

16. The method of claim 15, wherein each VM uses a common storage device driver and a common file system driver.

17. A method for storing data of a Virtual Machine, comprising:
   starting a Hypervisor that has exclusive control over at least some system resources and an interrupt descriptor table;
   starting a Virtual Machine Monitor (VMM) running with system level privileges and which is co-resident in system space with a host operating system (HOS), wherein the Hypervisor allocates resources to the VMM;
   creating a primary Virtual Machine (VM) without system level privileges and relocating the HOS to the primary VM, the deprivileged HOS having direct access to at least some I/O devices;
   creating a secondary Virtual Machine running without system level privileges;
   starting a storage device driver and a file system driver in the HOS;
   starting a VM-specific file system driver in the secondary VM;
   starting a VM-specific virtual device driver in the secondary VM that provides access to the virtual storage drive,
   wherein the VM specific virtual device driver has access to disk image files from a virtual device driver via the file system driver and a storage device driver; and
   mounting a virtual disk drive,
   wherein the virtual disk drive is represented on a storage device as a disk image, and
   wherein the disk image data is stored on the storage device as at least one file; and
   wherein the disk image comprises an internal structure that includes user data storage blocks and redirection blocks that point to user data storage blocks and that are used by the VM-specific file system driver,
   wherein the user data storage blocks and the redirection blocks of the virtual disk drive are visible to the host operating system, and
   wherein the host OS, the primary VM and the secondary VM access hardware of the computing system via a common secure interface.

18. A method for storing data of Virtual Execution Environments, comprising:
   starting a Virtual Machine Monitor (VMM) with system level privileges;
   creating a primary Virtual Machine (VM) without system level privileges and relocating a host operating system (HOS) to the primary VM;
   starting a safe interface providing secure access from the VMs to computing system hardware;
   creating a secondary Virtual Machine running without system level privilege, wherein the secondary VM uses the safe interface for accessing hardware;
   starting a storage device driver and a file system driver in the HOS;
   starting a VM-specific file system driver in the secondary VM;
   starting a VM-specific virtual device driver in the secondary VM that provides access to a virtual storage drive and has access to disk image files from the VM-specific virtual device driver via the file system driver, the storage device driver and the safe interface; and
   mounting a virtual disk drive for the secondary VM;
   wherein the virtual disk drive is represented on a storage device as a disk image; and
   the disk image data is stored on the storage device as at least one file; and
   wherein the disk image comprises an internal structure that includes user data storage blocks and redirection blocks that point to user data storage blocks and that are used by the VM-specific file system driver,
   wherein the user data storage blocks and the redirection blocks of the virtual disk drive are visible to the host operating system, and
   wherein at least some of the data of the VMs is accessible by multiple VMs, and access attempts by the VMs to other VM's data are redirected to the host OS.

19. A method for storing data of Virtual Execution Environments, comprising:
   starting a host operating system on a computing system that uses a system level file system cache for caching data being read or written to a storage device;
   starting a Virtual Machine Monitor (VMM) under the control of the host operating system;
   starting isolated Virtual Machines (VMs) on the computing system, wherein each VM executes its own guest OS kernel and each VM runs under the control of the VMM;
   starting a common storage device driver and a common file system driver in the operating system;
   mounting a virtual disk drive, the virtual disk drive provides correct functioning of the VMs;

starting VM-specific file system drivers in the VMs that, jointly with the common driver, supports a virtual disk drive that is represented on a storage device as a disk image;

wherein the disk image data is stored on the storage device as at least one file;

wherein writes to the at least one file are executed with bypassing the file system cache;

wherein an internal structure of the file enables writes to the disk image in a fault tolerant manner; and wherein any virtual disk writes are added to the file while preserving the internal structure integrity of the file at any moment of time; and wherein the internal structure of the file includes user data storage blocks and redirection blocks that are visible to the host OS and that point to user data storage blocks and that are used by the VM-specific file system driver, and wherein at least some files in the disk image are write-accessible by the host operating system and by one VM while being only read-accessible by other VMs.

20. A method for storing data of Virtual Private Servers (VPSs), comprising:

starting an operating system on a computing system;

initiating a plurality of VPSs on the computing system, all the VPSs sharing a single instance of the operating system that provides services to the VPSs in response to requests from the VPSs;

allocating, to each VPS, a dynamic virtual partition, wherein the size of the dynamic virtual partition changes in real time as VPS storage requirements change; and wherein the dynamic virtual partition contains used and unused data blocks that are visible to the operating system, and wherein at least some of the virtual partitions permit an over-commitment of resources to their corresponding VEEs relative to standard allocation of resources.

21. A computer program product for storing data of Virtual Machines (VMs), the computer program product comprising a non-transitory computer useable medium having computer program logic stored thereon for executing on at least one processor, the computer program logic comprising:

computer program code means for starting a host operating system on a computing system;

computer program code means for initiating a Hypervisor having full system privileges;

computer program code means for initiating a plurality of VMs on a single OS, the VMs being managed by a Virtual Machine Monitor (VMM), wherein at least one of the VMs is running a deprivileged Service OS, and wherein the Hypervisor has higher privileges than the VMM, processes all interrupts, protects the Interrupt Descriptor Table from the host operating system and handles resource allocation; and computer program code means for generating a dynamic virtual partition allocated to each VM, wherein the size of the dynamic virtual partition changes in real time as VM storage requirements change, and wherein the dynamic virtual partition contains used and unused data blocks that are visible to the host operating system.

* * * * *